United States Patent
Pahan et al.

(10) Patent No.: US 12,555,697 B2
(45) Date of Patent: Feb. 17, 2026

(54) METHOD FOR THE REMOVAL OF RADIONUCLIDES FROM AQUEOUS RADIOACTIVE WASTE

(71) Applicant: Dept of Atomic Energy Government of India, Mumbai (IN)

(72) Inventors: Sumit Pahan, Mumbai (IN); Arvind Ananthanarayanan, Mumbai (IN); Raman Kumar Mishra, Mumbai (IN); Dayamoy Banerjee, Mumbai (IN); Tessy Vincent, Mumbai (IN); Sugilal Gopalakrishnan, Mumbai (IN); Chetan Parkash Kaushik, Mumbai (IN)

(73) Assignee: Dept of Atomic Energy Government of India, Mumbai (IN)

( * ) Notice: Subject to any disclaimer, the term of this patent is extended or adjusted under 35 U.S.C. 154(b) by 1047 days.

(21) Appl. No.: 17/576,228

(22) Filed: Jan. 14, 2022

(65) Prior Publication Data

US 2023/0230717 A1 Jul. 20, 2023

(51) Int. Cl.
| | |
|---|---|
| G21F 9/10 | (2006.01) |
| B01D 59/00 | (2006.01) |
| C01G 25/00 | (2006.01) |
| C02F 1/52 | (2023.01) |
| C02F 1/62 | (2023.01) |
| C02F 1/66 | (2023.01) |
| C02F 1/68 | (2023.01) |
| C02F 101/00 | (2006.01) |
| G21G 1/00 | (2006.01) |

(52) U.S. Cl.
CPC ............... *G21F 9/10* (2013.01); *C01G 25/00* (2013.01); *C02F 1/5236* (2013.01); *C02F 1/62* (2013.01); *C02F 1/66* (2013.01); *C02F 1/68* (2013.01); *G21G 1/00* (2013.01); *B01D 59/00* (2013.01); *C02F 2101/006* (2013.01)

(58) Field of Classification Search
CPC ..... G21F 9/10; C02D 1/68; C02F 1/68; C22C 38/02
See application file for complete search history.

(56) References Cited

U.S. PATENT DOCUMENTS

| | | | | |
|---|---|---|---|---|
| 4,116,863 A | * | 9/1978 | Berton | G21F 9/12 423/2 |
| 4,758,313 A | * | 7/1988 | Schmieder | G21C 19/46 423/2 |
| 4,983,306 A | * | 1/1991 | Deininger | C02F 9/00 588/20 |

* cited by examiner

*Primary Examiner* — Anthony J Zimmer
*Assistant Examiner* — Annette Phan
(74) *Attorney, Agent, or Firm* — Gearhart Law LLC

(57) ABSTRACT

The present invention discloses a method for the separation of radionuclides from an aqueous radioactive waste solution, the method comprising: receiving of an aqueous radioactive waste solution, adding at least one zirconium salt to the aqueous radioactive waste solution, changing the pH of the radioactive waste solution to obtain a precipitate P, and separating the precipitate P from the radioactive waste solution. The present invention also discloses the use of zirconium salts, preferably zirconium oxychloride, zirconium nitrate or a zirconium oxynitrate or any mixture thereof, for the treatment of aqueous radioactive waste solution, preferably acidic or alkaline intermediate or low level radioactive waste solution, preferably an acidic intermediate and/or low level radioactive waste solution.

14 Claims, 2 Drawing Sheets

METHOD FOR THE REMOVAL OF RADIONUCLIDES FROM AQUEOUS RADIOACTIVE WASTE

TECHNICAL FIELD

Figure 1:
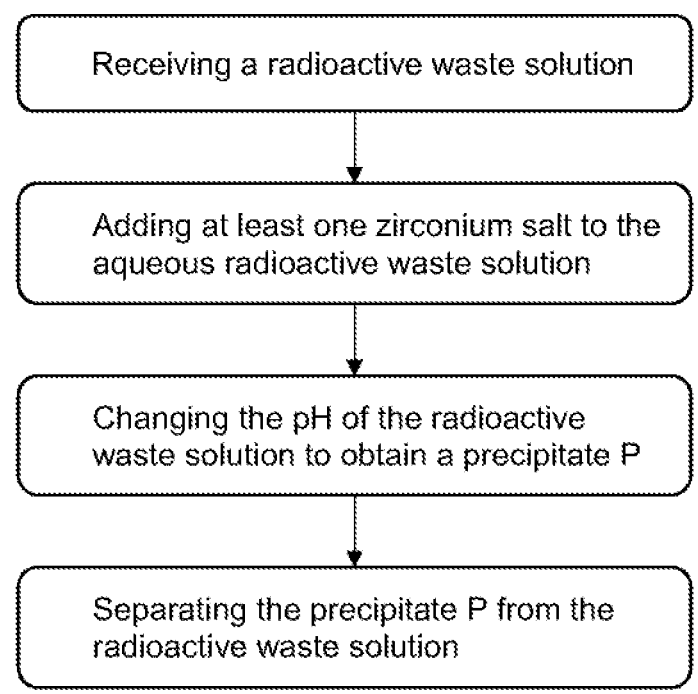

The present invention relates to the field of radioactive waste (IPC class G21C 19/00), specifically to a method for the separation of radionuclides from an aqueous radioactive waste solution management (IPC class G21C 19/46). The present invention also relates to a corresponding use.

BACKGROUND

Radionuclides are significant dose contributors in radioactive waste, especially in intermediate level radioactive Waste (ILW) and low level radioactive waste (LLW). The chemical and radiotoxicity of radionuclides is well known. A present strategy for the management of these species/ elements is a delay and decay approach with the intermediate level waste held in tanks for the period of around 30 years prior to discharge. However, this adds greatly to the cost of intermediate level radioactive waste and low level radioactive waste management at the back end of the fuel cycle of a nuclear power plant.

EP 2 224 354 7 A1 discloses a sorbent for antimony anions, consisting essentially of particles or granules of zirconium oxide having a distribution coefficient for antimony anions of at least 10,000 ml/g. The disadvantage of this sorbent is that it is not water soluble and that only antimony are targeted while ruthenium ions are not addressed in the disclosure.

EP 3 396 677 A1 also discloses a solid adsorbent capable of adsorbing radioactive antimony, radioactive iodine and radioactive ruthenium, the adsorbent comprising cerium (IV) hydroxide,
wherein the cerium (IV) hydroxide has the following properties: (1) a granular form having a particle size of 250 µm or more and 1200 µm or less, (2) in a thermogravimetric analysis, a weight reduction ratio is 4.0% or more and 10.0% or less when the temperature is increased from 200° C. to 600° C., and (3) in an infrared absorption spectrum analysis, absorption peaks are observed in ranges of 3270 cm-1 or more and 3330 $cm^{-1}$ or less, 1590 $cm^{-1}$ or more and 1650 $cm^{-1}$ or less, and 1410 $cm^{-1}$ or more and 1480 $cm^{-1}$ or less. This method has also the disadvantage, that a solid adsorbent media has to be provided, through which a nuclear wastes passes through. Also the efficiency of the radionuclide removal is limited.

SUMMARY OF THE INVENTION

The presently available methods to separate radionuclides from aqueous radioactive waste are limited in removal efficiency and also in economical efficiency.

The objective behind the present invention is thus the development of a process for the removal of radionuclides from an aqueous radioactive waste solution to significantly reduce the volume of radioactive waste to lower the environmental and economic footprint associated with aqueous radioactive waste management.

Accordingly, in a first, general aspect of the invention a method for the separation of radionuclides from an aqueous radioactive waste solution was found, the method comprising:

receiving of an aqueous radioactive waste solution,
adding at least one zirconium salt to the aqueous radioactive waste solution,
changing the pH of the radioactive waste solution to obtain a precipitate P, and
separating the precipitate P from the radioactive waste solution.

Since the aqueous radioactive waste contains significant fractions of corrosion products, the pH change results in the precipitation of various iron hydroxides and iron oxyhydroxides, which can adsorb radionuclides. It was surprisingly found that the use of zirconium salts increases the efficiency of the adsorption process.

In a second aspect of the method according to the first aspect of the present invention, the method further comprises flocculating the precipitate P, after the changing of the pH. Flocculating can help to increase the particle size of the precipitated species after changing of the pH, which can be beneficial for an efficient separation of the precipitate P from the radioactive waste solution.

Aspect three according to the first or second aspect of the present invention discloses a method further comprising, processing the solution obtained after separating the precipitate P to remove further species, preferably cesium and strontium species, prior to discharge. It can be necessary to further treat the radioactive waste solution obtained after separating the precipitate P to lower the environmental and health hazards prior to discharge. To this regard, the removal of cytotoxic cesium and strontium can be mandatory prior to discharging to the treated radioactive waste solution.

In a fourth aspect of the present invention according to any of the preceding aspects, a method is disclosed, wherein the at least one zirconium salt is added to the received aqueous radioactive waste solution prior to changing the pH of the radioactive waste solution to obtain the precipitate P. It was observed that adding the at least one zirconium salt to the received aqueous radioactive waste solution prior to changing the pH, helps to increase the efficiency of the removal of radionuclides from the aqueous radioactive waste solution.

According to a fifth aspect of the present invention according to any of the preceding aspects, the zirconium salt added to the aqueous radioactive waste solution is selected from zirconium salts with zirconium ions having an oxidation level of +4, preferably from the group comprising zirconium oxychloride, zirconium nitrate or a zirconium oxynitrate or any mixture thereof. It was found that these zirconium slats allow for high decontamination factors. The decontamination factor is calculated by dividing the specific activity of the radionuclides in Becquerel/milliliter in the provided aqueous radioactive waste by the activity of radionuclides in Becquerel/milliliter of the obtained aqueous solution after separating the precipitate P from the radioactive waste solution. Despite some zirconium slats being particular efficient in decreasing the decontamination factor, also other water soluble zirconium salts can be used.

In a sixth aspect of the present invention according to any of the preceding aspects, the at least one zirconium salt is added in its solid form and/or as an aqueous solution comprising the at least one zirconium salt. To ensure rapid and homogenous distribution of the zirconium salt a solution of the at least one zirconium salt can be added to the radioactive waste solution. The addition of the at least one zirconium salt is added in its solid form also ensures the efficient removal of radionuclides after the pH change.

In a sevenths aspect of the present invention according to any of the preceding aspects, the zirconium concentration of the solution obtained after adding at least one zirconium salt to the aqueous radioactive waste solution is in the range of 0.5 to 2.500 mg/l zirconium, preferably 1.0 to 2.25 mg/l zirconium, most preferably 1.5 to 2.0 mg/l. It was found, that a certain zirconium concentration needs to be exceeded to achieve high decontamination factors for the radioactive waste solution According to a eights aspect of the present invention according to any of the preceding aspects, the pH of the of the radioactive waste solution is changed to a pH range of 6 to 8, preferably to a pH of 6.5 to 7.5. The method is less efficient at an alkaline pH due to blocking of surface-active sites by hydroxide ions (OH$^-$) from the solution. In summary, the process works most efficiently at near neutral pH (pH 6 to 8). The aqueous radioactive waste contains significant concentrations of iron based corrosion products arising from the degradation of piping and other plant components. When the pH is changed towards the neutral region, most of these iron based corrosion products precipitate as iron hydroxides and oxyhydroxides. Without being bound to a theory it is assumed that this precipitation of iron species causes the radionuclides, in particular the ruthenium and antimony species, by hydroxide ion bridged adsorption on the surface of the corrosion products. However, the field strength of $Fe^{2+}/Fe^{3+}$ is lower than that of zirconium ions and the bulkier ruthenium and antimony bearing species are not as effectively adsorbed on the surface of the iron based corrosion products. Therefore, zirconium, preferably with an oxidation level of +4, allows for a higher field strength necessary for coordination with radionuclides, in particular antimony and ruthenium, bearing complexes in the solution. Therefore, a high surface area as evident in solution is a significant advantage of a solution-based adsorption process.

According to a ninths aspect of the present invention according to any of the preceding aspects, the aqueous radioactive waste solution is an acidic or alkaline intermediate or low level radioactive waste solution, preferably an acidic intermediate and/or low level radioactive waste solution. The process is most suitable for acidic intermediate or low level radioactive waste. It works also for alkaline intermediate or low level radioactive waste but with reduced efficiency. The reduced efficiency at an alkaline pH is most likely caused by blocking of surface-active sites by hydroxide ions (OH$^-$) from the solution. In general, the difference between low level and intermediate level radioactive waste is essentially only the activity of the waste and not the composition of the solution itself. Moreover the difference between acidic and alkaline radioactive waste is essentially only the pH of the radioactive waste solution. Typically, the activity of intermediate level radioactive waste is considered to range from around $3.7 \times 10^4$ Bq/ml to around $3.7 \times 10^7$ Bq/ml and low level radioactive waste therefore has an activity of less than around $3.7 \times 10^4$ Bq/ml.

According to aspect ten of the present invention according to aspect nine of the present invention, the pH of the of the radioactive waste solution is changed by adding at least one base to the received acidic aqueous low or intermediate level radioactive waste solution. Alternatively, the pH of the radioactive waste solution is changed by adding at least one acid to the received alkaline low or intermediate level radioactive waste solution.

According to aspect eleven of the present invention according to aspect ten of the present invention, the at least one base is a water soluble salt and/or an aqueous solution of a water soluble salt, wherein the water soluble salt is preferably an alkali metal hydroxide, more preferably sodium hydroxide, potassium hydroxide, lithium hydroxide, rubidium hydroxide, wherein sodium hydroxide is preferred or the at least one acid is hydrochloric acid (HCl), nitric acid (HNO$_3$) or sulfuric acid (H$_2$SO$_4$), wherein 1 M nitric acid is preferred. To ensure rapid and homogenous distribution of the base, an aqueous solution of the at least one base can be added to the radioactive waste solution. The addition of the at least on base in its solid form also ensures the efficient removal of radionuclides after the pH change. Strong bases like alkali metal hydroxides are preferred to limit the amount of mass added to the radioactive waste solution.

Aspect twelve of the present invention according to any of the preceding aspects, discloses a method wherein the radionuclides comprise ruthenium isotopes, preferably with a mass number of 106 and antimony isotopes, preferably with a mass number of 125. Both elements are significant dose contributors in radioactive waste, especially acidic intermediate or low level radioactive waste.

In a thirteens aspect of the present invention according to aspect twelve the ruthenium and antimony species of the solution provided in the received aqueous radioactive waste solution comprise $[RuNO(NO_3)_a(NO_2)_b(OH)_c(H_2O)_d]^{(3-a-b-c)}$ (a, b, c, and d coefficients are such that a+b+c+d=5) and Sb (V) as $Sb(OH)_6^-$.

Aspect fourteen of the present invention according to any of the preceding aspects, discloses a method, wherein the precipitate P comprises or consists of ruthenium and/or antimony, preferably and wherein ruthenium and/or antimony are precipitated simultaneously. Surprisingly, with the method according to the invention it is possible to simultaneously separate both ruthenium and antimony radionuclides. Simultaneous precipitation of both species allows for a single step precipitation which results in a cost effective method for the treatment of radioactive waste.

According to aspect fifteen of the present invention according to any of the preceding aspects, the temperature during the process, during receiving of an aqueous radioactive waste solution, adding at least one zirconium salt to the aqueous radioactive waste solution, changing the pH of the radioactive waste solution to obtain a precipitate P, and separating the precipitate P from the radioactive waste solution, or during receiving of an aqueous radioactive waste solution, adding at least one zirconium salt to the aqueous radioactive waste solution, changing the pH of the radioactive waste solution to obtain a precipitate P, flocculating the precipitate P, after the changing of the pH, and separating the precipitate P from the radioactive waste solution, or during receiving of an aqueous radioactive waste solution, adding at least one zirconium salt to the aqueous radioactive waste solution, changing the pH of the radioactive waste solution to obtain a precipitate P, flocculating the precipitate P, after the changing of the pH, separating the precipitate P from the radioactive waste solution, and processing the solution obtained after separating the precipitate P to remove cesium and strontium prior to discharge, is kept at room temperature, preferably between 20 to 40° C. Conducting the precipitation and separation at room temperature allows for high decontaminations factors while reducing the requirements to the used equipment. This does not mean, that using temperatures differing form 20 to 40° C. could not also be beneficial for the decontamination factor of aqueous radioactive waste achieved with the claimed method.

According to aspect sixteen of the present invention according to any of the preceding aspects, the separation of the precipitate P from the radioactive waste solution comprises the filtration or centrifugation of the solution obtained after changing the pH of the radioactive waste solution to obtain a precipitate P or flocculating the precipitate P, after the changing of the pH. The relatively small volume of radionuclides bearing precipitates after their separation, can be easily handled final storage in e.g. a solid cement block or similar matrices for final storage of the radioactive waste, which greatly reduces space requirements and cost for the management of radioactive waste. Since the precipitation and filtration occurs directly in the liquid, further steps necessary to fabricate/synthesize a supported sorbent structure is prevented. This aids in simplicity for scale-up, while maintaining high surface activity inherent in the solution state.

In a seventeens aspect of the present invention according to any of the preceding aspects, the activity in Becquerel/milliliter caused by ruthenium 106 and antimony 125 in the supernatant obtained after process step e) is at least 20 times, preferably 100, more preferably at least 300 times, even more preferably 500 times lower than the activity of the received aqueous radioactive waste solution, and/or wherein the activity in Becquerel/milliliter caused by ruthenium 106 and antimony 125 in the supernatant obtained after separating the precipitate P from the acidic radioactive waste solution is at least 100 times, preferably 300, more preferably at least 500 times lower than the activity of the received aqueous radioactive waste solution, and/or wherein the activity in Becquerel/milliliter caused by ruthenium 106 and antimony 125 in the supernatant obtained after separating the precipitate P from the alkaline radioactive waste solution is at least 20 times, preferably 30 times lower than the activity of the received aqueous radioactive waste solution.

Surprisingly high decontamination factors after a single precipitation step can be obtained with the present method, which allows direct and rapid processing of the aqueous radioactive waste without being dependent on long storage times of the aqueous radioactive waste to decrease the activity of the aqueous radioactive waste to be able to process the aqueous radioactive waste prior to its discharge.

Aspect eighteen of the present invention according to any of the preceding aspects, discloses the use of zirconium salts, preferably zirconium oxychloride, zirconium nitrate or a zirconium oxynitrate or any mixture thereof, for the treatment of aqueous radioactive waste solution, preferably acidic or alkaline intermediate or low level radioactive waste solution, preferably an acidic intermediate and/or low level radioactive waste solution.

The method according to the invention is directed to the separation of radionuclides form aqueous radioactive waste by adding soluble salts of zirconium to the aqueous radioactive waste and conducting a single pH-changing step. The radionuclides bearing precipitates can be separated to obtain a clean, radionuclides lean solution. This radionuclides lean solution can then be subjected to further treatments as necessary prior to discharge. The relatively small volume of precipitates can be isolated, which greatly reduces space requirements and costs, which allows significant reductions in the ecological and economic footprint of radioactive waste management.

Further features and advantages of the invention will be apparent from the following description, in which examples of embodiments of the invention are explained by means of schematic drawings, without thereby limiting the invention.

FIG. 1 Flow chart of the method according to an embodiment of the present invention.

Figure 2:
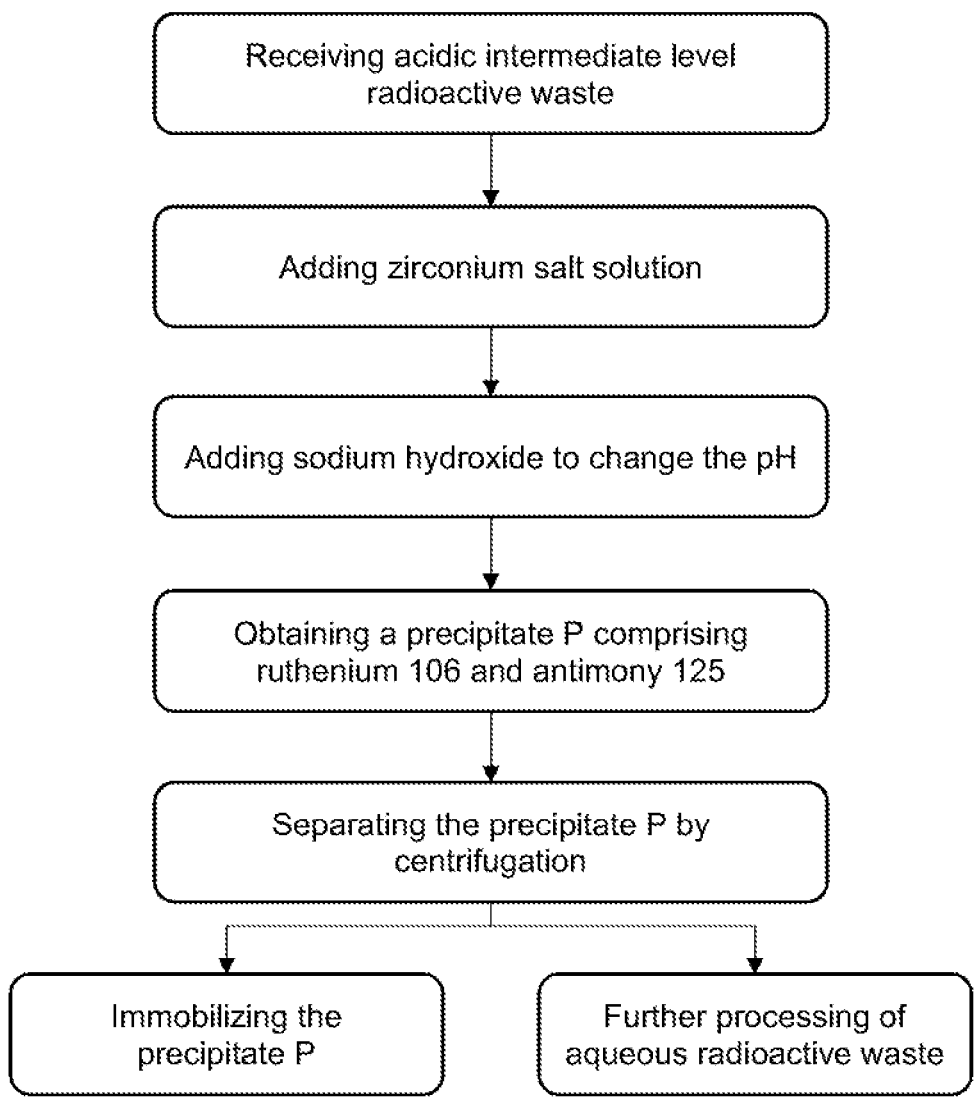

FIG. 2 Flow chart of a preferred embodiment of the present invention for the simultaneous removal of ruthenium and antimony from acidic intermediate level radioactive waste.

DETAILED DESCRIPTION

According to embodiments of the invention as claimed, provided is a method for the separation of radionuclides from an aqueous radioactive waste solution, the method comprising: a) receiving of an aqueous radioactive waste solution, b) adding at least one zirconium salt to the aqueous radioactive waste solution, c) changing the pH of the radioactive waste solution to obtain a precipitate P, and d) separating the precipitate P from the radioactive waste solution.

FIG. 1 shows a flow chart of the method according an embodiment of the present invention. In this flow chart four consecutive steps are shown. In a first step a), the aqueous radioactive waste solution is received. In a second step b), the at least one zirconium salt is added to the aqueous radioactive waste solution. In a third step the pH of the radioactive waste solution is changed to obtain a precipitate P. In the last fourth step d), the precipitate P is separated from the radioactive waste solution. It can also be possible to change the pH of the radioactive waste solution prior to adding the at least one zirconium salt, meaning that step c) is conducted before step b).

The operations of the method can be especially effective in an in-situ process for the separation of the radionuclides ruthenium 106 and antimony 125 from acidic intermediate level radioactive waste and low level radioactive waste. Ruthenium 106 and antimony 125 constitute a significant hazard in intermediate level radioactive waste and low level radioactive waste management, as they are radiotoxic and cytotoxic.

Since the aqueous radioactive waste contains significant fractions of corrosion products, a pH change results in the precipitation of various iron hydroxides and iron oxyhydroxides, which can adsorb radionuclides, in particular ones like ruthenium and antimony. The inventors have recognized that the use of zirconium salts increases the efficiency of the adsorption process.

The flow chart shown in FIG. 2 illustrates a preferred embodiment of the present invention for the simultaneous removal of ruthenium and antimony from acidic intermediate level radioactive waste (ILW), comprising the steps:

a) Receiving 500 ml acidic aqueous intermediate level radioactive waste in a container, b) Adding 1.0 mg/l of a water soluble zirconium salt solution, c) Adding 25 ml of 10 M sodium hydroxide solution to the solution to gradually increase the pH of the solution to a range of 6 to 8, to obtain a precipitate and ruthenium 106 and antimony 125 lean aqueous intermediate level radioactive waste.

d) The precipitates bearing ruthenium 106 and antimony 125 species are separated from the ruthenium 106 and antimony 125 lean aqueous intermediate level radioactive waste by centrifugation.

e) Ruthenium 106 and Antimony 125 lean aqueous intermediate level radioactive waste can be taken for further processing such as cesium and strontium removal prior to discharge and the precipitate P can be immobilized, for example by incorporation into a solid cement block for long time storage.

Due to this process a ruthenium 106 and antimony 125 bearing phase of much smaller volume than the original provided acidic aqueous intermediate level radioactive waste can be stored for further processing. The decontamination factor (DF) for Ruthenium 106 and Antimony 125 significantly exceeds 300, so that the intermediate level radioactive waste can be discharged after cesium and strontium removal.

Further, exemplary embodiments of the process according to the invention are described below.

TABLE 1

A detailed waste composition which is treated with the method according to the invention.
Typical characteristics of acidic raffinate post PUREX, actinide and fission product removal

| | |
|---|---|
| HNO3 molarity (M) | 3.7 |
| Gross αradiation (Bq/ml) | 21 |
| Gross Beta radiation (Bq/ml) | $4.4 \times 10^5$ |
| $^{137}Cs$ (Bq/ml) | $4.1 \times 10^3$ |
| $^{90}Sr$ & $^{90}Y$ (Bq/ml) | $<4.1 \times 10^3$ |
| $^{134}Cs$ (Bq/ml) | $<4.1 \times 10^3$ |
| $^{125}Sb$ (Bq/ml) | $2.2 \times 10^5 - 3.0 \times 10^5$ |
| $^{106}Ru$ (Bq/ml) | $7.4 \times 10^4 - 1.1 \times 10^5$ |

PUREX means that plutonium-uranium recovery by extraction was already aqueous radioactive waste, as well as actinide and fission product removal.

The test method for determination of the decontamination factor (DF) is specified below:

Decontamination factor $(DF)$ =

$$\frac{\text{Activity of the received radioactive waste solution}}{\text{Activity of the radioactive waste solution after seperation of the precipitate } P}$$

The detection was performed by gamma spectroscopy using a calibrated multi-channel analyzer (MCA) to detect the 428 keV gamma emission of antimony 125 and 511 keV gamma emission of ruthenium 106. Typically, 0.5 ml of the solution to be analyzed were taken in a gamma vial and placed in the analyzer for measurement. The higher activity wastes were measured for around 10 minutes, while the low activity solutions, e.g. the solution after precipitation and separation of the ruthenium and antimony species, required hour of measurement to accumulate enough data. Each measurement was repeated at least three times to ensure accuracy. The limit of detection with the applied gamma spectroscopy is around 19 Bq/ml.

Example 1: Effect of pH on ruthenium 106 and antimony 125 removal by in-situ precipitation of zirconium (IV) hydroxide ($Zr(OH)_4$). The first batch of studies were carried out on a 50 ml scale using cesium lean intermediate level radioactive waste to ascertain the effect of pH on ruthenium and antimony removal. In all experiments shown in Table 1, a constant zirconium dosing of 1.0 mg/l zirconyl dichloride ($ZrOCl_2$) was maintained. Starting pH was varied between 4 to 12. Ruthenium 106 activity in the feed was $9.6 \times 10^4$ Bq/ml, while antimony 125 activity was $2.3 \times 10^5$ Bq/ml. Table 2 summarizes the effect of pH on the decontamination factor.

TABLE 2

Effect of the pH on the Ruthenium 106 and Antimony 125 decontamination factor.

| pH | Decontamination factor of antimony 125 | Supernatant activity of ruthenium 106 |
|---|---|---|
| 4 | 415 | 342 |
| 6 | 1000 | below limit of detection |

TABLE 2-continued

Effect of the pH on the Ruthenium 106 and Antimony 125 decontamination factor.

| pH | Decontamination factor of antimony 125 | Supernatant activity of ruthenium 106 |
|---|---|---|
| 8 | 810 | 1368 |
| 10 | 270 | 162 |
| 12 | 220 | 13 |

Table 2 shows that the Decontamination Factor (DF) obtained are highest for both antimony and ruthenium between pH 6 to 8, indicating that the process works most optimally at circumneutral pH.

Example 2: Effect of the zirconium concentration on ruthenium and antimony removal by in-situ precipitation of zirconium hydroxide ($Zr(OH)_4$). In these experiments, the concentration of zirconium in the solution obtained using zirconyl dichloride ($ZrOCl_2$) was varied at a constant pH of 6 of the solution and the effect on ruthenium and antimony removal was observed. Ruthenium 106 activity in the feed was 9.6 Bq/ml, while antimony 125 activity was $2.3 \times 10^5$ Bq/ml. The results are collected in Table 3.

TABLE 3

Effect of the zirconium concentration on the ruthenium 106 and antimony 125 decontamination factor according to example 2.

| Zirconium concentration in mg/l | Solution activity of antimony 125 in Bq/ml after separation of the precipitate | Solution activity of ruthenium 106 in Bq/ml after separation of the precipitate |
|---|---|---|
| 0.5 | 281 | 89 |
| 1.0 | 229 | below limit of detection |
| 1.5 | 93 | below limit of detection |
| 2.0 | 56 | below limit of detection |
| 2.5 | 56 | below limit of detection |

It is shown that zirconium concentrations of 2.0 mg/l or greater allows most efficient removal of ruthenium 106 and antimony 125.

Example 3: Effect of zirconium source on ruthenium 106 and antimony 125 removal by in-situ precipitation of zirconium (IV) hydroxide ($Zr(OH)_4$). The effect of various zirconium sources to achieve a zirconium concentration of 1.0 mg/l in the acidic intermediate level radioactive waste at pH 6 was investigated. Ruthenium 106 activity in the feed was 2.1 Bq/ml, while antimony 125 activity was 9.5 Bq/ml. The results of these studies are collected in Table 4.

TABLE 4

Effect of zirconium source on ruthenium 106 and antimony 125 removal according to example 3.

| | Solution activity of antimony 125 in Bq/ml after separation of the antimony precipitate | Decontamination factor 125 | Solution activity of ruthenium 106 in Bq/ml after separation of the precipitate | Decontamination factor ruthenium 106 |
|---|---|---|---|---|
| $Zr(NO_3)_4$ | 52 | 4000 | 52 | 1828 |
| $ZrO(NO_3)_2$ | 78 | 2666 | 178 | 533 |
| $ZrOCl_2$ | 41 | 5090 | 63 | 1505 |

The results shown in Table 4 demonstrate high removal efficiency for all three tested zirconium salts.

Example 4: Decontamination factors achieved for intermediate alkaline radioactive waste with a pH of 12. In this experiment, the concentration of zirconium in the solution obtained using zirconyl dichloride (ZrOCl$_2$) was adjusted to 1.0 mg/l, followed by the addition of 1 M nitric acid to reduce the pH of the radioactive waste solution to pH 6 to 7. Ruthenium 106 activity in the feed was 9.6 Bq/ml, while antimony 125 activity was 2.5×10$^5$ Bq/ml. The results are collected in Table 5.

TABLE 5

Effect on the activity of intermediate alkaline radioactive waste after ruthenium 106 and antimony 125 removal according to example 4.

| Solution activity of antimony 125 in Bq/ml after separation of the precipitate | Decontamination factor antimony 125 | Solution activity of ruthenium 106 in Bq/ml after separation of the precipitate | Decontamination factor ruthenium 106 |
|---|---|---|---|
| 303 | 83 | 311 | 31 |

In the dependent claims, in the description and in the figures, preferred aspects, embodiments and examples have been described for the invention, which invention being defined by the appended independent claims. In case these dependent claims, aspects, embodiments and examples comprise features which are not recited in the appended independent claims, these features are optional features that are not essential, but may be beneficial, for the invention. One or more of these optional features may be combined with each other and with any one of the appended claims.

The invention claimed is:

1. A method for the separation of radionuclides from an aqueous radioactive waste solution, the method consisting essentially of:
   receiving of an aqueous radioactive waste solution,
   adding at least one zirconium salt to the aqueous radioactive waste solution,
   changing the pH of the radioactive waste solution to obtain a precipitate P, and
   separating the precipitate P from the radioactive waste solution by filtration or centrifugation.

2. The method according to claim 1,
   wherein the change in pH of the radioactive waste solution to obtain the precipitate P is done prior to adding at least one zirconium salt to the received aqueous radioactive waste solution.

3. The method according to claim 1,
   wherein the zirconium salt added to the aqueous radioactive waste solution is selected from zirconium salts with zirconium ions having an oxidation level of +4.

4. The method according to claim 1,
   wherein the at least one zirconium salt is added in its solid form and/or as an aqueous solution comprising the at least one zirconium salt.

5. The method according to claim 1,
   wherein the zirconium concentration of the solution obtained after adding at least one zirconium salt to the aqueous radioactive waste solution is in the range of 0.5 to 2.5 mg/l zirconium.

6. The method according to claim 1,
   wherein the pH of the of the radioactive waste solution is changed to a pH range of 6 to 8.

7. The method according to claim 1, wherein the aqueous radioactive waste solution is an acidic or alkaline intermediate or low level radioactive waste solution.

8. The method according to claim 7, wherein the pH of the of the radioactive waste solution is changed by adding one of the additives selected from the group consisting of: at least one base to the received acidic aqueous low or intermediate level radioactive waste solution;
   and
   at least one acid to the received alkaline low or intermediate level radioactive waste solution.

9. The method according to claim 8,
   wherein the at least one base is a water soluble salt and/or an aqueous solution of a water soluble salt;
   and
   the at least one acid is hydrochloric acid (HCl), nitric acid (HNO$_3$) or sulfuric acid (H$_2$SO$_4$).

10. The method according to claim 1, wherein the radionuclides comprise ruthenium and antimony.

11. The method according to claim 1,
    wherein the precipitate P comprises or consists of ruthenium and/or antimony.

12. The method according to claim 1,
    wherein the temperature during the process, during
       receiving of an aqueous radioactive waste solution, adding at least one zirconium salt to the aqueous radioactive waste solution, changing the pH of the radioactive waste solution to obtain a precipitate P, and separating the precipitate P from the radioactive waste solution,
    or during receiving of an aqueous radioactive waste solution, adding at least one zirconium salt to the aqueous radioactive waste solution, changing the pH of the radioactive waste solution to obtain a precipitate P, flocculating the precipitate P, after the changing of the pH, and separating the precipitate P from the radioactive waste solution,
    or during receiving of an aqueous radioactive waste solution, adding at least one zirconium salt to the aqueous radioactive waste solution, changing the pH of the radioactive waste solution to obtain a precipitate P, flocculating the precipitate P, after the changing of the pH, separating the precipitate P from the radioactive waste solution, and processing the solution obtained after separating the precipitate P to remove cesium and strontium prior to discharge,
    is kept at a temperature between 20 to 40° C.

13. The method according to claim 1, wherein the separation of the precipitate P from the radioactive waste solution comprises the filtration or centrifugation of the solution obtained after changing the pH of the radioactive waste solution to obtain a precipitate P or flocculating the precipitate P, after the changing of the pH.

14. The method according to claim 1, wherein activity in Becquerel/milliliter caused by ruthenium 106 and antimony 125 in the supernatant obtained after separating the precipitate P from the radioactive waste solution is at least 20 times lower than the activity of the received aqueous radioactive waste solution.

* * * * *